(No Model.)
F. P. DAVIDSON.
CAR WHEEL.
No. 376,865. Patented Jan. 24, 1888.
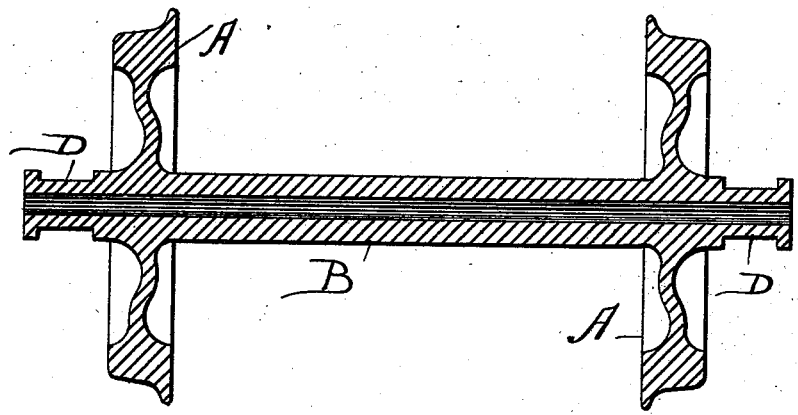
WITNESSES
A. S. Paré
C. C. Linthicum
INVENTOR
Francis P. Davidson,
By Banning & Banning.
Attorneys

UNITED STATES PATENT OFFICE.

FRANCIS P. DAVIDSON, OF SOUTH CHICAGO, ILLINOIS.

CAR-WHEEL.

SPECIFICATION forming part of Letters Patent No. 376,865, dated January 24, 1888.

Application filed February 7, 1887. Serial No. 226,847. (No model.)

*To all whom it may concern:*

Be it known that I, FRANCIS P. DAVIDSON, a citizen of Great Britain, residing at South Chicago, Cook county, Illinois, have invented certain new and useful Improvements in Car-Wheels, of which the following is a specification.

The object of my invention is to make a pair of car-wheels integral with their journals and connecting-shaft; and it consists in the features and details of construction hereinafter described and claimed.

In the drawing I have represented a vertical section of a pair of car-wheels with their journals and connecting-shaft cast together.

In the drawing, A represents the wheel, B the shaft, and D the journal.

In making my improved car-wheels I cast them, preferably, of steel, and with the journals, which operate in proper bearings in the truck, and the shaft, by which they are connected together, cast integral or solid with the wheels, and preferably hollow, as shown in the drawing. In such case the tires or surfaces of the wheel intended to come into direct contact with the rails may be cast also integral or separately, as may be preferred by the manufacturer. In the drawing I have shown the wheels cast with their tires, journals, and connecting-shaft all integral or solid, as above described.

In some cases, however, manufacturers may prefer to cast or make the tires in a separate piece and afterward shrink or otherwise apply them to the wheels. This is a matter for the consideration of the manufacturer, and I do not therefore limit myself absolutely to either the casting of the wheels with the tires integral therewith or to casting them without the tires; and where the wheels are cast with the tires on them they may afterward, as the surface becomes worn, be turned or trued into proper condition and a tire applied to them.

I wish to state, further, that in speaking of my invention as applied to car-wheels I mean to include railway-car wheels, street-car wheels, locomotive-wheels, engine-wheels, truck, and similar wheels, and I use the word "car" in the claims as inclusive and descriptive of these various wheels.

What I regard as new, and desire to secure by Letters Patent, is—

1. As a new article of manufacture, a pair of car-wheels provided with journals and a connecting-shaft cast integral therewith, substantially as described.

2. As a new article of manufacture, a pair of car-wheels provided with a connecting-shaft cast integral therewith, substantially as described.

FRANCIS P. DAVIDSON.

Witnesses:
THOMAS A. BANNING,
E. F. HUBBARD.